United States Patent
Park et al.

(10) Patent No.: US 9,871,274 B2
(45) Date of Patent: Jan. 16, 2018

(54) SECONDARY BATTERY WITH PROTECTION CIRCUIT MODULE WITH LABEL AND RELEASE SHEET

(71) Applicant: Samsung SDI Co., Ltd., Yongin-si, Gyeonggi-do (KR)

(72) Inventors: Kwangyoung Park, Yongin-si (KR); Insoo Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 247 days.

(21) Appl. No.: 14/727,680

(22) Filed: Jun. 1, 2015

(65) Prior Publication Data
US 2016/0218396 A1  Jul. 28, 2016

(30) Foreign Application Priority Data
Jan. 27, 2015 (KR) .................. 10-2015-0012805

(51) Int. Cl.
*H01M 10/42* (2006.01)
*H01M 2/34* (2006.01)
*H01M 2/02* (2006.01)

(52) U.S. Cl.
CPC ......... *H01M 10/425* (2013.01); *H01M 2/344* (2013.01); *H01M 2/0212* (2013.01); *H01M 2220/30* (2013.01)

(58) Field of Classification Search
CPC .................................................. H01M 2/344
See application file for complete search history.

(56) References Cited

U.S. PATENT DOCUMENTS

| | | | | |
|---|---|---|---|---|
| 7,541,771 | B1* | 6/2009 | Leavitt | H01M 2/0215 320/107 |
| 2004/0142239 | A1* | 7/2004 | Morita | H01M 2/0207 429/181 |
| 2006/0147792 | A1* | 7/2006 | Nelson | G06K 19/0702 429/65 |
| 2008/0305367 | A1* | 12/2008 | Baek | H01M 2/0215 429/7 |
| 2009/0191450 | A1* | 7/2009 | Kim | H01M 2/021 429/97 |
| 2009/0317703 | A1* | 12/2009 | Kwag | H01M 2/204 429/159 |

(Continued)

FOREIGN PATENT DOCUMENTS

JP  2002-100333 A  4/2002
KR  2012-0123172 A  11/2012

*Primary Examiner* — Barbara L Gilliam
*Assistant Examiner* — Robert S Carrico
(74) *Attorney, Agent, or Firm* — Knobbe Martens Olson & Bear LLP

(57) ABSTRACT

Provided is a battery pack, which can be prevented from being released from a label adhered to a frame or a battery cell due to distortion applied to the battery pack, thereby preventing noises from being generated during movement of an adhered surface of the label. A battery pack is also provided, which may prevent electrostatic discharge (ESD). The battery pack includes a battery cell, a protective circuit module (PCM) electrically connected to the battery cell, a frame accommodating the battery cell and the PCM, and a label adhered to the battery cell, the PCM and the frame while surrounding the same. A release sheet is attached to a region of the label surrounding the PCM.

19 Claims, 4 Drawing Sheets

(56) References Cited

U.S. PATENT DOCUMENTS

| | | | | |
|---|---|---|---|---|
| 2012/0270074 A1* | 10/2012 | Koh | ............... | H01M 2/0212 |
| | | | | 429/7 |
| 2013/0034752 A1* | 2/2013 | Choi | ............... | H01M 2/022 |
| | | | | 429/7 |
| 2013/0216866 A1* | 8/2013 | Kim | ............ | H01M 10/0436 |
| | | | | 429/7 |
| 2014/0147707 A1* | 5/2014 | Choi | ............... | H01M 10/04 |
| | | | | 429/7 |
| 2015/0147599 A1* | 5/2015 | Lee | ............... | H01M 2/1022 |
| | | | | 429/7 |

* cited by examiner

SECONDARY BATTERY WITH PROTECTION CIRCUIT MODULE WITH LABEL AND RELEASE SHEET

RELATED APPLICATIONS

This application claims priority from Korean Patent Application No. 10-2015-0012805 filed on Jan. 27, 2015 in the Korean Intellectual Property Office, and all the benefits accruing therefrom under 35 U.S.C. 119, the contents of which in its entirety are herein incorporated by reference.

BACKGROUND

Field

The present invention relates to a battery pack.

Description of the Related Art

In general, an electronic device, such as a notebook computer, a mini notebook computer, a net book, a mobile computer, an ultra mobile personal computer (UMPC) or a portable multimedia player (PMP), utilizes as a portable power supply such as a battery pack that includes a plurality of battery cells connected to each other in series or/and in parallel. The battery pack includes a protective circuit module (PCM) for protecting the battery cells from over-charge, over-discharge or over-current, and the battery cells and the PCM are included together in a frame.

Recently, as electronic devices have been developed to be lighter, thinner, and smaller, a battery pack needs to have a very small thickness. In order to reduce the thickness of a battery pack employed to the device, a tape-like label may be attached to a frame to fix and protect the battery cell and the PCM in the frame. Here, a hard type label may be used as the label for fixing and protecting the battery cell and the PCM.

As the thickness of a device is reduced, the device may become flexible and a battery pack accommodated in the device may also be bent or transformed with the device.

However, if the battery pack is bent or transformed, noises may be generated while an adhered surface of the hard label is released from a battery cell or a frame.

SUMMARY OF CERTAIN INVENTIVE ASPECTS

The present invention provides a battery pack, which can be prevented from being released from a label adhered to a frame or a battery cell due to distortion applied to the battery pack, thereby preventing noises from being generated during movement of an adhered surface of the label.

The present invention also provides a battery pack, which may prevent electrostatic discharge (ESD).

These and other objects of the present invention will be described in or be apparent from the following description of the preferred embodiments.

According to an aspect of the present invention, there is provided a battery pack including a battery cell, a protective circuit module (PCM) electrically connected to the battery cell, a frame accommodating the battery cell and the PCM, and a label adhered to the battery cell, the PCM and the frame while surrounding the same, wherein a release sheet is attached to a region of the label surrounding the PCM.

The label may include a first label surrounding a first surface of the battery cell, a first surface of the PCM and a first surface of the frame, and a second label surrounding a second surface of the battery cell opposite to the first surface of the battery cell, a second surface of the PCM opposite to the first surface of the PCM and a second surface of the frame opposite to the first surface of the frame.

The battery cell may include a first battery cell and a second battery cell each having an electrode tab protruding to one side and shaped of a plate.

The electrode tab of the first battery cell and the electrode tab of the second battery cell may face each other and may be connected to the PCM at opposite sides of the PCM.

The PCM may include a plate-shaped circuit board having a plurality of wire patterns formed thereon, at least one protective circuit element formed to protrude on a first surface of the circuit board, and a conductive pad formed on a second surface opposite to the first surface of the circuit board and connected to the electrode tab of the battery cell.

The first label may have a first exposed region formed by removing a region of the release sheet, and a region where the at least one protective circuit element is formed may correspond to the first exposed region.

The first exposed region of the first label may be adhered to one surface of the at least one protective circuit element.

The second label may have a second exposed region formed by removing a region of the release sheet, and a region where the electrode tab of the battery cell is connected to the conductive pad corresponds to the second exposed region.

The second exposed region of the second label may be adhered to one surface of the electrode tab of the battery cell.

The first label may further include a fixing part adhered to a portion of the frame and fixing the first label.

The PCM may further include an external terminal extending from one end of the circuit board to the outside of the frame.

An exposing hole for exposing the external terminal may be formed at one side of the frame.

As described above, the battery pack according to the present invention can be prevented from being released from a label adhered to a frame or a battery cell due to distortion applied to the battery pack, thereby preventing noises from being generated during movement of an adhered surface of the label.

In addition, the battery pack according to the present invention can be preventing electrostatic discharge (ESD).

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF CERTAIN INVENTIVE EMBODIMENTS

Hereinafter, examples of embodiments of the invention will be described in detail with reference to the accompanying drawings such that they can easily be made and used by those skilled in the art.

An exemplary embodiment will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey embodiments of the invention to those skilled in the art.

As used herein, the term "and/or" includes any and all combinations of one or more of the associated listed items. The terminology used herein is for the purpose of describing particular embodiments and is not intended to be limiting of the invention. As used herein, singular forms are intended to include the plural forms as well, unless the context clearly indicates otherwise. It will be further understood that the terms "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another element, component, region, layer or section.

Figure 1:
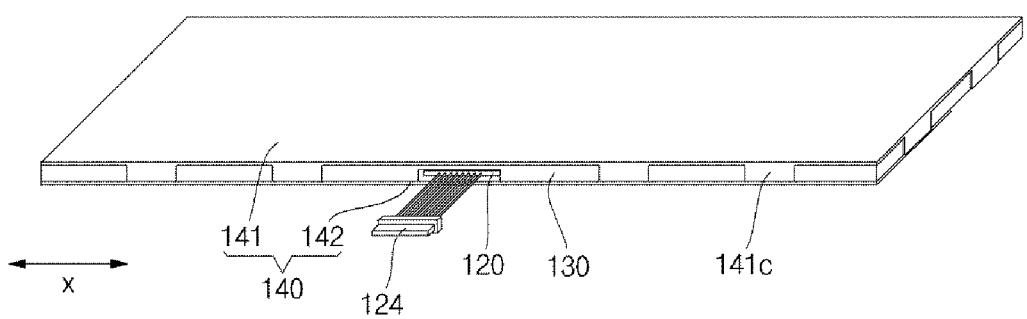
FIG. 1 is a perspective view of a battery pack according to an embodiment of the present invention.
Figure 2A:
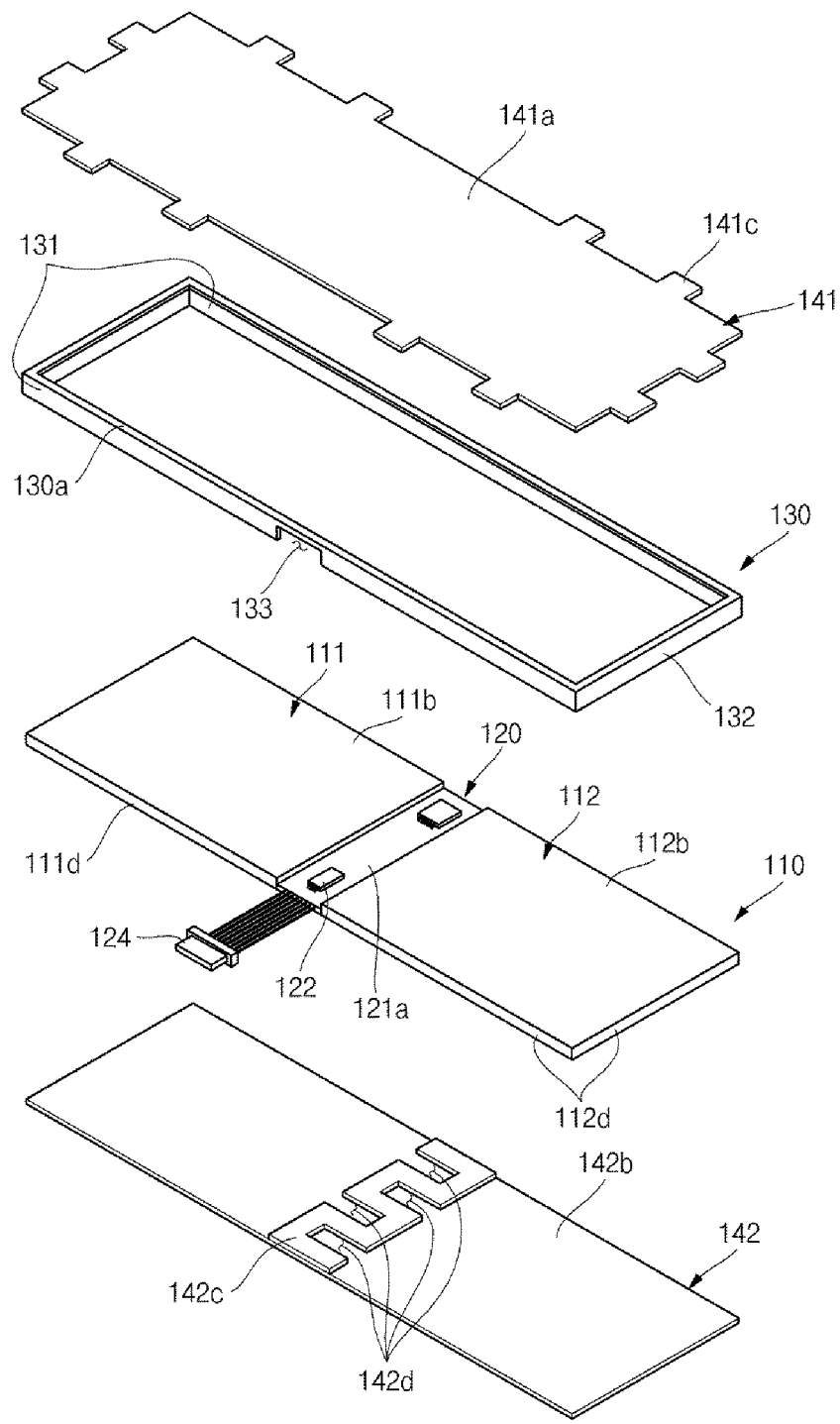
FIG. 2A is an exploded a perspective view of the battery pack shown in FIG. 1.
Figure 2B:
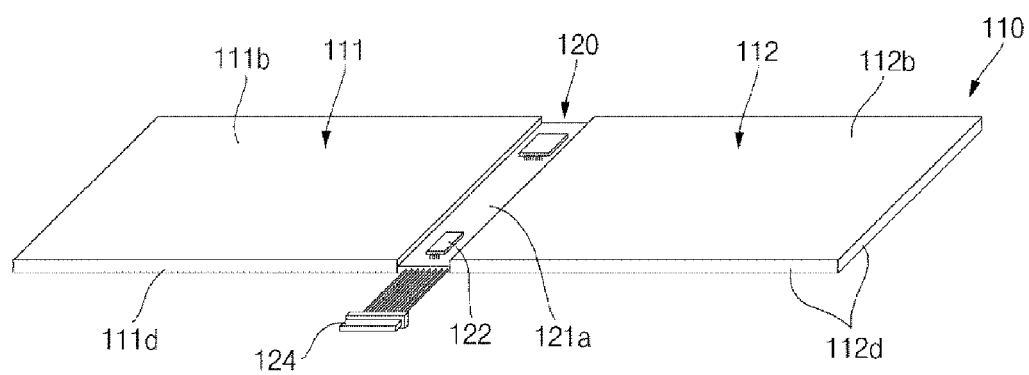
FIG. 2B is a top perspective view of the battery pack shown in FIG. 1.
Figure 2C:
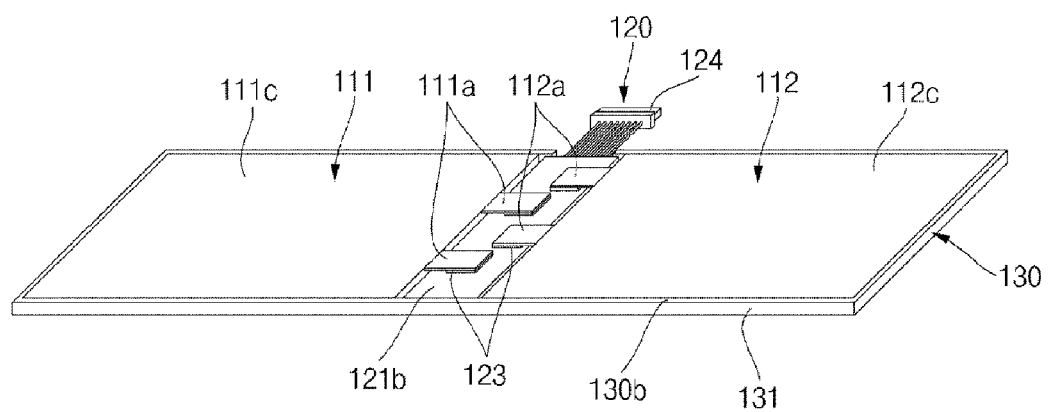
FIG. 2C is a bottom perspective view of the battery pack shown in FIG. 1.
Figure 3A:
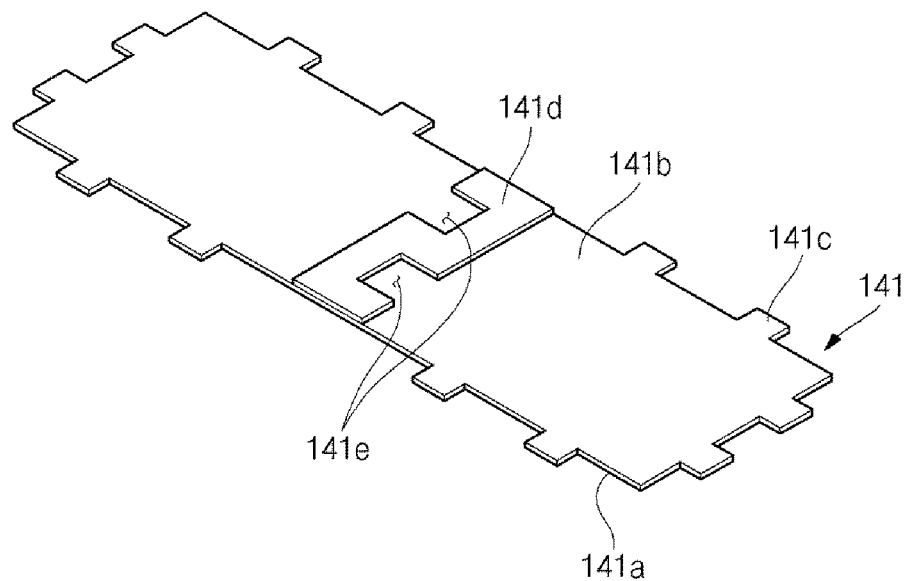
FIG. 3A is a perspective view illustrating a first label of the battery pack shown in FIG. 1 g to an embodiment of the present invention and FIG. 3B is a perspective view illustrating a second label of the battery pack shown in FIG. 1.
Figure 3B:
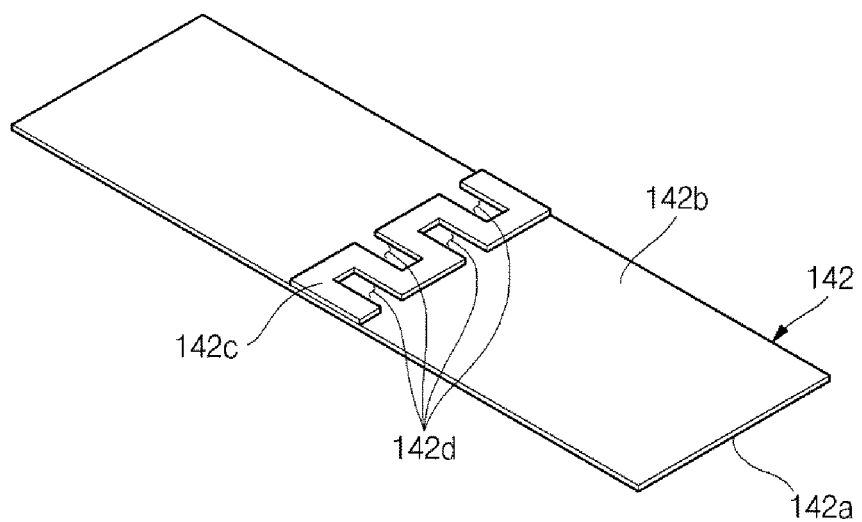

FIG. 1 is a perspective view of a battery pack according to an embodiment of the present invention, FIG. 2A is an exploded a perspective view of the battery pack shown in FIG. 1, FIG. 2B is a top perspective view of the battery pack shown in FIG. 1, and FIG. 2C is a bottom perspective view of the battery pack shown in FIG. 1, and FIG. 3A is a perspective view illustrating a first label of the battery pack shown in FIG. 1 and FIG. 3B is a perspective view illustrating a second label of the battery pack shown in FIG. 1.

First, referring to FIGS. 1 and 2A, the battery pack according to an embodiment of the present invention includes a battery cell 110, a protective circuit module (PCM) 120 electrically connected to the battery cell 110, a frame 130 accommodating the battery cell 110 and the PCM 120, and a label 140 surrounding the battery cell 110, the PCM 120 and the frame 130

The battery cell 110 may include a first battery cell 111 having an electrode tab 111a protruding to one side and a second battery cell 112 having an electrode tab 112a protruding to face the electrode tab 111a of the first battery cell 111. That is to say, the battery cell 110 may include the first battery cell 111 and the second battery cell 112 disposed such that the electrode tabs 111a and 112a face each other on substantially the same plane.

Here, each of the first and second battery cells 111 and 112 of the battery cell 110 may include a battery case having an open surface and an electrode assembly and an electrolyte accommodated in the battery case. Here, the electrode assembly and the electrolyte electrochemically react with each other to generate energy. The battery case may be sealed by a top surface of the battery cell 110 including a cap assembly, for example.

In addition, the electrode tabs 111a and 112a of the first battery cell 111 and the second battery cell 112 are electrically connected to the PCM 120 while they face each other. The first battery cell 111 and the second battery cell 112 may be pouch-type batteries, but aspects of the present invention are not limited thereto. In the illustrated embodiment, two battery cells connected to the PCM are exemplified, but aspects of the present invention are not limited thereto. That is to say, two or more battery cells disposed on the same plane may be electrically connected to the PCM 120.

The first and second battery cells 111 and 112 are battery cells shaped of slim plates and have planar first surfaces 111b and 112b and second surfaces 111c and 112c opposite to the first surfaces 111b and 112b, respectively. The first surfaces 111b and 112b and second surfaces 111c and 112c of the battery cells 111 and 112 may be rectangular. In addition, the battery cells 111 and 112 may have four sidewalls 111d and 112d connecting four edges of the first surfaces 111b and 112b and second surfaces 111c and 112c, respectively. The electrode tabs 111a and 112a of the battery cells 111 and 112 protrude through one selected from the four sidewalls 111d and 112d, respectively. In addition, each of the battery cells 111 and 112 may include each two of the electrode tabs 111a and 112a having opposite polarities. In addition, the first battery cell 111 and the second battery cell 112 may have the same configuration, but aspects of the present invention are not limited thereto.

The PCM 120 may be positioned between one sidewall 111d from which the electrode tab 111a of the first battery cell 111 protrudes and one sidewall 112d from which the electrode tab 112a of the second battery cell 112 protrudes. That is to say, the first battery cell 111 and the second battery cell 112 are connected to the PCM 120 at opposite sides of the PCM 120.

The PCM 120 includes a circuit board 121 having a plurality of wire patterns and shaped of a plate. In addition, the PCM 120 may further include a plurality of protective elements 122 protruding on a first surface 121a of the circuit board 121. The PCM 120 may further include a conductive pad 123 protruding on a second surface 121b of the circuit board 121, opposite to the first surface 121a and connected to the electrode tabs 111a and 112a of the battery cell 110. That is to say, the PCM 120 is electrically connected to the electrode tabs 111a and 112a of the battery cell 110 through the conductive pad 123 formed on the circuit board 121. In addition, the PCM 120 may further include an external terminal 124 electrically connected to one end of the circuit board 121 and protruding a predetermined length to one side of the frame 130. The external terminal 124 may be electrically connected to the wire patterns of the circuit board 121. That is to say, the external terminal 124 may be electrically connected to the battery cell 110 through the circuit board 121 and the battery cell 110 may be charged or discharged through the external terminal 124.

A first surface of the PCM 120 may be same as the first surface 121a of the circuit board 121 and a second surface of the PCM 120 may be same as the second surface 121b of the circuit board 121.

The first surface 121a of the circuit board 121, the first surface 111b of the first battery cell 111 and the first surface 112a of the second battery cell 112 may be top surfaces in FIG. 2A, and the second surface 121b of the circuit board 121, the second surface 111c of the first battery cell 111 and the second surface 112c of the second battery cell 112 may be bottom surfaces in FIG. 2A.

The frame 130 accommodates the battery cell 110 and the PCM 120 and may protect the same from external environments. The frame 130 includes first and second frames 131 and 132 having rectangular frameworks, which surround outer surfaces of the first battery cell 111 and the second battery cell 112 connected to the PCM 120. Here, the rectangular frame includes two long sidewalls 131 and two short sidewalls 132.

In addition, the frame 130 may include a top edge 130*a* and a bottom edge 130*b* opposite to the top edge 130*a*. An exposing hole 133 for exposing the external terminal 124 of the PCM 120 to the outside is formed at the bottom edge 130*b*.

In addition, the top edge 130*a* of the frame 130 may be an edge coplanar with the first surface 111*b* of the first battery cell 111 and the first surface 112*b* of the second battery cell 112. In addition, the bottom edge 130*b* may also be an edge coplanar with the second surface 111*c* of the first battery cell 111 and the second surface 112*c* of the second battery cell 112.

In the frame 130, the first battery cell 111, the PCM 120 and the second battery cell 112 are arranged in a line in a lengthwise direction (x).

An exposing hole 133 may be formed at the center of one of the long sidewalls 131. The exposing hole 133 may be located to correspond to the external terminal 124 of the PCM 120.

The label 140 includes a first label 141 adhered to the top edge 130*a* of the frame 130 and a second label 142 adhered to the bottom edge 130*b* of the frame 130. The label 140 may be adhered to the frame 130 by an adhesive component provided on a surface opposite to the frame 130. The label 140 may be made of polyethylene terephthalate (PET), but not limited thereto.

The first label 141 is adhered to the first surface 111*b* of the first battery cell 111 and the first surface 112*a* of the second battery cell 112 while being adhered to the top edge 130*a* of the frame 130. That is to say, the first label 141 are adhered to the frame 130, the first battery cell 111 and the second battery cell 112 so as to entirely cover the top edge 130*a* of the frame 130.

Referring to FIG. 3A together with FIGS. 1 to 2C, a first surface 141*a* of the first label 141 is exposed to the outside and a second surface 141*b* of the first label 141, opposite to the first surface 141*a*, is adhered to the first battery cell 111, the second battery cell 112 and the frame 130.

In addition, the first label 141 may extend to the bottom edge 130*b* of the frame 130 and may further include a plurality of fixing parts 141*c* for adhering and fixing the label 140 while surrounding exterior portions of the frame 130.

In addition, a first release sheet 141*d* is formed roughly at the center of the second surface 141*b* of the first label 141. The first release sheet 141*d* may be generally formed of a PET film, a polyester film or paper, but aspects of the present invention are not limited thereto.

Here, the first release sheet 141*d* may be a release sheet remaining after removing a portion other than a plate-shaped release sheet for protecting an adhesive component of the second surface 141*b* of the first label 141. The first release sheet 141*d* may be a release sheet separately attached after entirely removing the plate-shaped release sheet.

Here, the first release sheet 141*d* may be located and sized to correspond to the PCM 120. Therefore, when the first label 141 is adhered to the battery cell 110 and the frame 130, the first release sheet 141*d* is brought into contact with the first surface 121*a* of the protective circuit board 121.

Like the protective circuit board 121, the first release sheet 141*d* has a substantially rectangular shape and has first exposed regions 141*e* formed by removing a region of the first release sheet 141*d*.

The first exposed region 141*e* is located and sized to correspond to the protective circuit element 122 formed on the first surface 121*a* of the protective circuit board 121. Therefore, when the first label 141 is adhered to the battery cell 110 and the frame 130, the protective circuit element 122 of the protective circuit board 121 may be adhered to the adhesive component exposed to the first exposed region 141*e* of the first release sheet 141*d*.

That is to say, the first label 141 may prevent or inhibit noises generated when a boundary portion of the battery cell 110 and the PCM 120 is moved by the first release sheet 141*d* corresponding to the first surface 121*a* of the protective circuit board 121. In addition, an electrostatic discharge (ESD) can be inhibited or prevented through the first release sheet 141*d* covering the PCM 120, so that a separate ESD cap is not necessarily provided on the PCM 120. by location the first release sheet 141*d* the interface between the first label 141 and the battery cell 110 and PCM 120, so, prevent to attachment and/or separation the hard type label to the battery cell 110 and PCM 120, and remove the space between the first label 141 and the battery cell 110 and PCM 120, It is possible to prevent noise generated during the flow of the adhesive side of the first label 141.

The second label 142 is adhered to the second surface 111*c* of the first battery cell 111 and the second surface 112*c* of the second battery cell 112 while being adhered to the bottom edge 130*b* of the frame 130. In addition, the second label 142 is also adhered to the second surface 121*b* of the protective circuit board 121. The second label 142 may be adhered to cover at least portions of the second surface 111*c* of the first battery cell 111 and the second surface 112*c* of the second battery cell 112.

Referring to FIG. 3B together with FIGS. 1 to 2C, a first surface 142*a* of the second label 142 is exposed to the outside and a second surface 142*b* of the second label 142, opposite to the first surface 142*a*, is adhered to the first battery cell 111, the second battery cell 112 and the frame 130.

In addition, a second release sheet 142*c* is formed roughly at the center of the second surface 142*b* of the second label 142. The second release sheet 142*c* may be generally formed of a PET film, a polyester film or paper, but aspects of the present invention are not limited thereto.

Here, the second release sheet 142*c* may be a release sheet remaining after removing a portion other than a plate-shaped release sheet for protecting an adhesive component of the second surface 142*b* of the second label 142. The second release sheet 142*c* may be a release sheet separately attached after entirely removing the plate-shaped release sheet.

Here, the second release sheet 142*c* may be located and sized to correspond to the PCM 120. Therefore, when the second label 142 is adhered to the battery cell 110 and the frame 130, the second release sheet 142*c* is brought into contact with the second surface 121*b* of the protective circuit board 121.

Like the protective circuit board 121, the second release sheet 142*c* has a substantially rectangular shape and has a second exposed region 142*d* formed by removing a region of the second release sheet 142*c*.

The second exposed region 142*d* is located and sized to correspond to the electrode tabs 111*a* and 112*a* of the battery cells 111 and 112 formed on the second surface 121*b* of the protective circuit board 121. Therefore, when the second label 142 is adhered to the battery cell 110 and the frame 130, the electrode tabs 111*a* and 112*a* of the battery cells 111 and 112 may be adhered to the adhesive component exposed to the second exposed region 142*d* of the second release sheet 142*c*.

That is to say, the second label 142 may prevent or inhibit noises generated when a boundary portion of the battery cell 110 and the PCM 120 is moved by the second release sheet 142c corresponding to the second surface 121b of the protective circuit board 121. In addition, an electrostatic discharge (ESD) can be prevented or inhibited through the second release sheet 142c covering the PCM 120, so that a separate ESD cap is not necessarily provided on the PCM 120. by location the second release sheet 142c the interface between the second label 142 and the battery cell 110 and PCM 120, so, prevent to attachment and/or separation the hard type label to the battery cell 110 and PCM 120, and remove the space between the second label 142 and the battery cell 110 and PCM 120, It is possible to prevent noise generated during the flow of the adhesive side of the second label 142.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A battery pack comprising:
a battery cell;
a protective circuit module (PCM) electrically connected to the battery cell;
a frame accommodating the battery cell and the PCM; and
a label adhered to the battery cell, the PCM and the frame while surrounding the same,
wherein a release sheet is attached to a region of the label surrounding the PCM and wherein the release sheet includes at least one opening so as to define a first exposed region such that the label is directly attached to at least one component of the protection circuit module (PCM) through the first exposed region.

2. The battery pack of claim 1, wherein the label comprises:
a first label surrounding a first surface of the battery cell, a first surface of the PCM and a first surface of the frame; and
a second label surrounding a second surface of the battery cell opposite to the first surface of the battery cell, a second surface of the PCM opposite to the first surface of the PCM and a second surface of the frame opposite to the first surface of the frame.

3. The battery pack of claim 2, wherein the battery cell includes a first battery cell and a second battery cell each having an electrode tab protruding to one side and shaped of a plate.

4. The battery pack of claim 3, wherein the electrode tab of the first battery cell and the electrode tab of the second battery cell face each other and are connected to the PCM at opposite sides of the PCM.

5. The battery pack of claim 4, wherein the PCM comprises:
a plate-shaped circuit board having a plurality of wire patterns formed thereon;
at least one protective circuit element formed to protrude on a first surface of the circuit board; and
a conductive pad formed on a second surface opposite to the first surface of the circuit board and connected to the electrode tab of the battery cell.

6. The battery pack of claim 5, wherein the first exposed region of the first label is adhered to one surface of the at least one protective circuit element.

7. The battery pack of claim 5, wherein the second label has a second exposed region that is defined by an opening in the release sheet where the electrode tab of the battery cell is connected to the conductive pad and where the second label is connected to the conductive pad or electrode tabs.

8. The battery pack of claim 7, wherein the second exposed region of the second label is adhered to one surface of the electrode tab of the battery cell.

9. The battery pack of claim 5, wherein the PCM further comprises an external terminal extending from one end of the circuit board to the outside of the frame.

10. The battery pack of claim 9, wherein an exposing hole for exposing the external terminal is formed at one side of the frame.

11. The battery pack of claim 2, wherein the first label further comprises a fixing part adhered to a portion of the frame and fixing the first label.

12. A battery pack comprising:
a battery cell having at least one electrode tab;
a protective circuit module (PCM) electrically connected to the battery cell via conductive pads;
a frame accommodating the battery cell and the PCM; and
a label adhered to the battery cell, the PCM and the frame while surrounding the same,
wherein a release sheet is attached to a region of the label surrounding the PCM and wherein the release sheet includes at least one opening such that the label is exposed and is directly attached to either the at least one conductive pads or the at least one electrode tab through the at least one opening of the release sheet.

13. The battery pack of claim 12, wherein the label comprises:
a first label surrounding a first surface of the battery cell, a first surface of the PCM and a first surface of the frame; and
a second label surrounding a second surface of the battery cell opposite to the first surface of the battery cell, a second surface of the PCM opposite to the first surface of the PCM and a second surface of the frame opposite to the first surface of the frame.

14. The battery pack of claim 13, wherein the battery cell includes a first battery cell and a second battery cell each having an electrode tab protruding to one side and shaped of a plate.

15. The battery pack of claim 14, wherein the electrode tab of the first battery cell and the electrode tab of the second battery cell face each other and are connected to the PCM at opposite sides of the PCM.

16. The battery pack of claim 15, wherein the PCM comprises:
a plate-shaped circuit board having a plurality of wire patterns formed thereon;
at least one protective circuit element formed to protrude on a first surface of the circuit board; and
a conductive pad formed on a second surface opposite to the first surface of the circuit board and connected to the electrode tab of the battery cell.

17. The battery pack of claim 16, wherein the openings in the release sheet define a first exposed region of the first label that is adhered to one surface of the at least one protective circuit element.

18. The battery pack of claim 17, wherein the second label has a second exposed region that is defined as the portion of the second label positioned within an opening formed in the release sheet, and the second label is attached to the conductive pads corresponds to the second exposed region.

19. The battery pack of claim 18, wherein the second exposed region of the second label is adhered to one surface of the electrode tab of the battery cell.

* * * * *